United States Patent
Gomez et al.

(10) Patent No.: US 10,817,857 B2
(45) Date of Patent: Oct. 27, 2020

(54) SYSTEMS AND METHODS FOR PROVIDING MULTIPLE COMMUNICATIONS NETWORK OPTIONS

(71) Applicant: MasterCard International Incorporated, Purchase, NY (US)

(72) Inventors: Alexander Gomez, Doral, FL (US); Lender Sang, Hialeah, FL (US); Armando Muniz, Pembroke Pines, FL (US); Joaquin Castillo, Miami, FL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 921 days.

(21) Appl. No.: 15/184,825

(22) Filed: Jun. 16, 2016

(65) Prior Publication Data
US 2017/0364883 A1    Dec. 21, 2017

(51) Int. Cl.
*G06Q 20/10* (2012.01)
*G06Q 40/02* (2012.01)

(52) U.S. Cl.
CPC .......... *G06Q 20/108* (2013.01); *G06Q 40/02* (2013.01)

(58) Field of Classification Search
CPC .. G06Q 10/063; G06Q 10/0631; G06Q 20/00; G06Q 20/108; G06Q 30/0641; G06Q 20/3223; G06Q 20/322; G06Q 20/32; G06Q 20/325
See application file for complete search history.

(56) References Cited

U.S. PATENT DOCUMENTS

| | | | |
|---|---|---|---|
| 6,311,165 B1 | 10/2001 | Coutts et al. | |
| 6,912,230 B1 | 6/2005 | Salkini et al. | |
| 8,447,693 B2 | 5/2013 | Lynch et al. | |
| 9,276,804 B2 | 3/2016 | Carney | |
| 9,306,770 B2 | 4/2016 | Aguilar et al. | |
| 9,354,855 B2* | 5/2016 | Kruglick | G06F 8/36 |
| 9,461,873 B1* | 10/2016 | Marr | H04L 41/00 |
| 9,965,808 B1* | 5/2018 | Kunz | G06Q 40/12 |
| 2001/0011256 A1* | 8/2001 | Hannula | G06Q 20/027 |
| | | | 705/79 |

(Continued)

OTHER PUBLICATIONS

"'Colocation' Definition." TechTarget. Aug. 2015. <https://searchmicroservices.techtarget.com/definition/colocation-colo>. (2 pages). (Year: 2015).*

*Primary Examiner* — Elda G Milef
(74) *Attorney, Agent, or Firm* — Armstrong Teasdale LLP

(57) ABSTRACT

A networking system for transmitting a data message from one or more remote client devices to a central processing hub is provided. The system includes a plurality of communications networks each connecting the central processing hub with the one or more remote client devices. The plurality of communications networks includes at least two separate communications networks. The system also includes at least one interface processor and a communication routing (CR) computing device connected to each of the communications networks. The CR computing device is configured to receive a data message from the one or more remote client devices, and direct the data message to one of the communications networks for transmission to the central processing hub. The data message is a payment transaction data message.

20 Claims, 8 Drawing Sheets

(56) References Cited

U.S. PATENT DOCUMENTS

| | | | |
|---|---|---|---|
| 2003/0076840 A1* | 4/2003 | Rajagopal | H04L 41/0213 370/395.21 |
| 2008/0147552 A1* | 6/2008 | Morsillo | G06Q 20/102 705/44 |
| 2010/0085948 A1* | 4/2010 | Yu | H04L 12/66 370/338 |
| 2013/0268357 A1* | 10/2013 | Heath | H04L 63/00 705/14.53 |

* cited by examiner

SYSTEMS AND METHODS FOR PROVIDING MULTIPLE COMMUNICATIONS NETWORK OPTIONS

BACKGROUND

This disclosure relates generally to the field of network communications, and more specifically, to systems and methods for providing multiple communications network options for routing data messages to a central processing hub.

Computing devices are oftentimes connected together so that one computing device is able to communicate with another computing device. In many cases, multiple computing devices are connected via a communication link in such a manner that allows many different computing devices to communicate with many other computing devices. These communication links are typically referred to as "networks." Thus, a network may consist of two or more computers that are communicatively linked together in order to share resources (e.g., printers, CDs, etc.), exchange files, or allow electronic communications. The computers on a network may be linked through cables, telephone lines, radio waves, satellites, or infrared light beams.

Computers connected to a network are broadly categorized as servers or client devices (workstations). Servers are generally not used by humans directly, but rather, run continuously to provide "services" to the other computers (and their human users) on the network. Services provided can include printing and faxing, software hosting, file storage and sharing, messaging, data storage and retrieval, complete access control (security) for the network's resources, and many others.

Client devices or workstations typically have a human user who interacts with the network through the client device or workstation. Client devices traditionally include a desktop, consisting of a computer, keyboard, display, and mouse, or a laptop, with an integrated keyboard, display, and touchpad. With the advent of the tablet computer and touch screen devices, the definition of a "client device" has evolved to include a great many more computing devices, because of their ability to interact with a network and utilize network services.

In some cases, client devices can be networked with other client devices and/or a server system. In other cases, multiple servers can be networked together along with multiple client devices. An example of a server-client network can be found in the payment processing industry. For example, when a payment card is used by a cardholder at a merchant terminal to initiate a transaction (e.g., a purchase), "transaction data" is typically transmitted by a merchant server to a merchant bank computing device. The merchant bank computing device must communicate the transaction data to a central processing server.

Upon receiving the transaction data, the central processing server must have the capability to further communicate with different banking entities, such as the merchant bank and an issuing bank. These banking entities determine whether the cardholder's account is in good standing and whether the purchase is covered by the cardholder's available credit line or account balance. Based on these determinations, the transaction is declined or accepted. A decline or acceptance message is communicated back to the merchant.

In order for these banking entities to communicate with the central processing server over a communications network, these banking entities may be required to have an interface processor that interfaces between the banking entities' computing devices and the communications network. In particular, the interface processor enables the banking entity to communicate with the central processing server over the communications network linking these devices.

At least some known communications networks used for transmitting and processing data (such as transaction data) rely primarily on an interface processor physically located at a datacenter of an entity (i.e., a merchant bank, an issuer bank, and/or any party connected to the central processing server via the communications network) and a telecommunication link from the interface processor to the central processing server. However, installing the interface processor at all of the datacenter locations can be time consuming and costly. Moreover, it can also be costly to maintain these systems. In addition, these systems can be somewhat limiting in that they may not provide multiple network options for their users. This lack of network options may reduce service reliability for an entity in the event that the telecommunication link and/or an interface processor on which the entity relies becomes unavailable.

Accordingly, it would be desirable to have a system that enables multiple computing devices to communicate with a central processing server via one or more of multiple network options, and that more efficiently positions interface processors within a network to reduce costs and an amount of time needed to link additional parties to the network.

BRIEF DESCRIPTION OF THE DISCLOSURE

In one aspect, a networking system for transmitting a data message from one or more remote client devices to a central processing hub is provided. The system includes a plurality of communications networks each connecting the central processing hub with the one or more remote client devices. The plurality of communications networks includes at least two separate communications networks. The system also includes at least one interface processor connected to each of the plurality of communications networks, and a communication routing (CR) computing device connected to each of the plurality of communications networks. The CR computing device is configured to receive a data message from the one or more remote client devices, and direct the data message to one of the plurality of communications networks for transmission to the central processing hub. The data message is a payment transaction data message.

In another aspect, a computer-implemented method for transmitting a data message from one or more remote client devices to a central processing hub is provided. The method is implemented using the one or more remote client devices, the central processing hub, at least one interface processor, and a plurality of communications networks. The method includes connecting the central processing hub with the one or more remote client devices. The plurality of communications networks includes at least two separate communications networks. The method further includes associating at least one interface processor with each of the communications networks of the plurality of communications networks. The method also includes configuring the central processing hub to receive the data message transmitted by the one or more remote client devices over one of the networks of the plurality of networks via the interface processor.

In a further aspect, a communication routing (CR) computing device for enabling a remote client device to transmit a data message using a selected communications network is provided. The CR computing device is in communication with the remote client device and at least two communications networks. The CR computing device includes a processor and a memory coupled to the processor. The processor is configured to monitor a set of conditions for the at least two communications networks. The processor is further configured to select a communications network from the at least two communications networks based on a set of conditions. The processor is also configured to enable the remote client device to transmit the data message using the selected communications network.

In yet another aspect, a hybrid networking system for transmitting a data message from one or more remote client devices to a central processing hub is provided. The system includes the one or more remote client devices located at one or more respective client datacenters, the central processing hub, a first communications network, and a second communications network. The first communications network includes a first interface processor located proximate to the one or more remote client devices in a client datacenter, and a first communication link linking the one or more remote client devices to the first interface processor and the central processing hub. The second communications network includes a second interface processor located remote from the one or more remote client devices, and a second communication link linking the one or more remote client devices to the first interface processor and the central processing hub.

DETAILED DESCRIPTION

Figure 1:
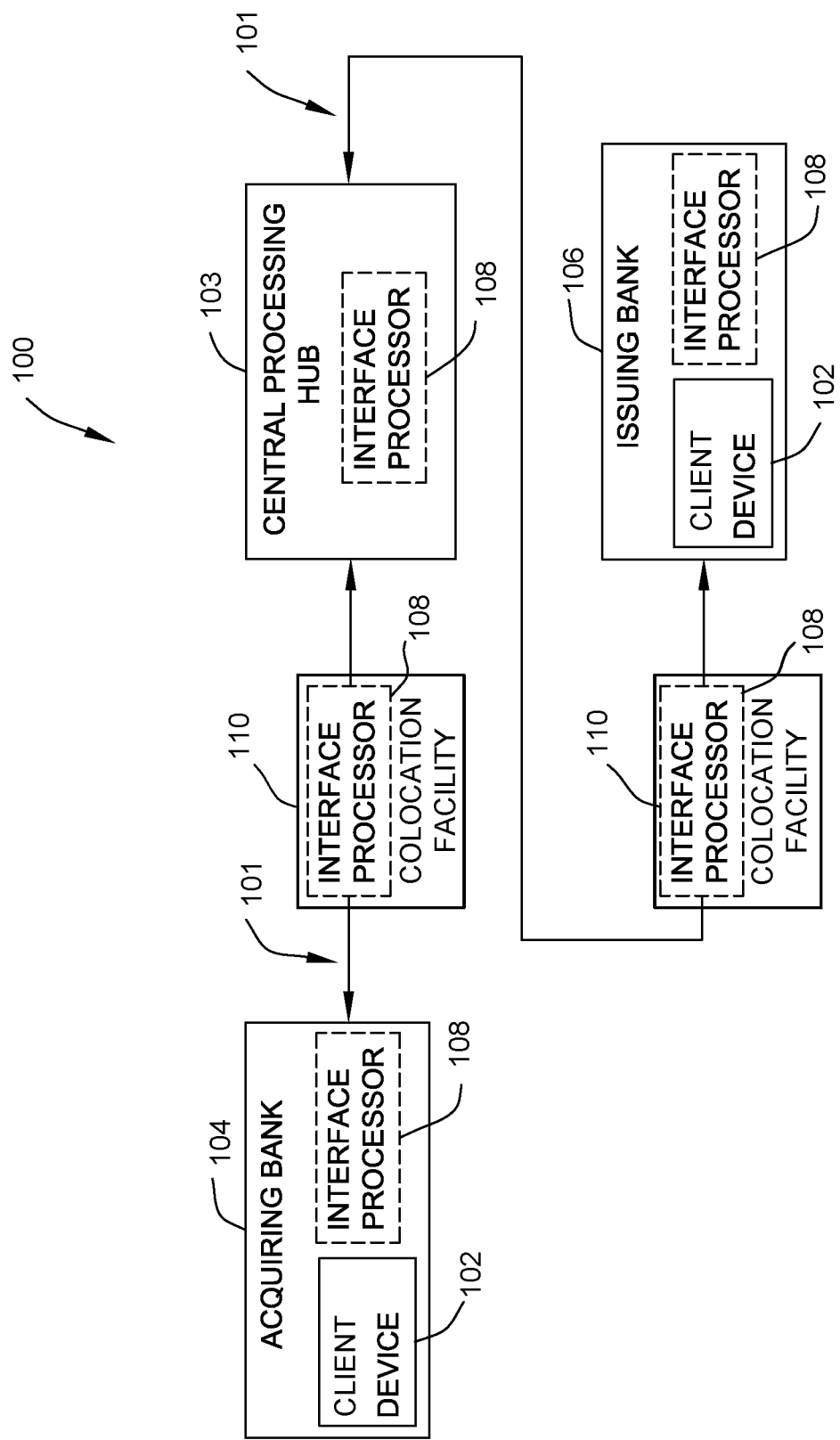
FIG. 1 is an example system for processing data messages, such as payment card transactions, using a communications network to communicatively connect a client device to a central processing hub.

The systems and methods described herein provide multiple communications network options for transmitting data messages (e.g., network messages including transaction data) from a client device to a central processing hub/server (e.g., the BANKNET® network of MasterCard International Incorporated). In the example embodiment, the system provides such network options as a datacenter communications network, a colocation communications network, a mixed communications network, and/or an internet protocol/virtual private network (IP/VPN) communications network. As used herein, a client device refers generally to a datacenter computing device and/or a general processor (i.e., distinguished from an "interface processor," as used herein) typically located at a merchant bank and/or an issuer bank and/or, in some cases, at a merchant. The client device transmits one or more data messages through an interface processor to communicate the data messages to the central processing hub over one or more of the communications networks. Each of these communications networks is described in detail herein.

Each communications network includes one or more interface processors (e.g., MASTERCARD INTERFACE PROCESSOR™ or MIP™ processor). An interface processor includes processing hardware and a software system that interfaces with one or more communication links of the communications network to connect to and communication with the central processing hub. In one embodiment, a communication routing (CR) computing device is in communication with a client device. The CR computing device is configured to monitor a set of conditions for the one or more communications networks and select a network to transmit a data message from the client device to the central processing hub.

A "datacenter communications network" includes an interface processor coupled to a client device through a first communications link (e.g., a direct wired or wireless connection) also referred to as a "host-link". The host-link may include an internet-based connection, for example, DSL, wireless, cable, or satellite, such as those commercially provided by internet providers (e.g., Comcast®, Time Warner Cable®, etc.). The interface processor is physically located at a facility of the merchant bank and/or the issuer bank (e.g., at a client datacenter). The interface processor is in communication with the central processing hub through a second communication link, a dedicated telecommunication link. In the example embodiment, the dedicated telecommunication link includes a physical network provided by a telecommunications company or provider (e.g., AT&T®, Verizon®, etc.) that directly connects a client datacenter (e.g., a bank) to the central processing hub. The dedicated telecommunications link may include copper wire lines, fiber optic lines, microwave relays, a Multiprotocol Label Switching (MPLS) transport network, etc. The interface processor is configured to interface with the dedicated telecommunication link to facilitate data communication between the client device and the central processing hub. In some embodiments, there are multiple client devices, multiple interface processors, and/or multiple dedicated telecommunication links providing connectivity between the client devices and the central processing hub.

A "colocation communications network" includes one or more dedicated or shared interface processors located within a regionally based colocation facility, rather than at a client facility. A colocation facility provides space, power, cooling, and physical security for servers, storage, and networking equipment. In one embodiment, the regionally based colocation facility includes a plurality of rack-mounted interface processors. An internet-based host-link (e.g., through an internet service provider) is established between the client device and at least one of the interface processors located in the colocation facility. Each interface processor is further in communication with the central processing hub through a dedicated telecommunication link. Each interface processor is configured to interface with the dedicated telecommunication link to facilitate data communication between the client device and the central processing hub. In some embodiments, the colocation communications network includes redundant telecommunication links between the central processing hub and a plurality of colocation facilities, which may ensure that data processing may continue even in the event that one of the redundant telecommunications links fails.

An "IP/VPN communications network" includes a plurality of rack-mounted interface processors physically located at the central processing hub. A client device is connected, via an IP network or a VPN, to one or more of these interface processors located at the central processing hub, thereby enabling communication between the client device and the central processing hub without needing an interface processor located at a client facility or a colocation facility. Such networks may facilitate faster integration into the system, and therefore faster connection between the client device and the central processing hub, because only a host-link communications link (e.g., an internet connection) is needed. In some embodiments, one or both of the client device and the central processing hub may be required to provide and/or install a firewall to ensure data security of the data message transmitted therebetween. Firewalls provide both an encryption termination point for an Internet Protocol Security (IPSec) connection and access security to the Internet.

A "mixed communications network" includes at least two of the datacenter communications network, the colocation communications network, and the IP/VPN communications network. In one example embodiment, the mixed communications network includes a datacenter communications network and a colocation communications network. A first connection is provided via a dedicated telecommunication link between the central processing hub and an interface processor located physically located at a client facility (e.g., at a client device). A second connection is provided via an internet-based host-link between the client device and an interface processor physically located within a colocation facility. The interface processors are further connected to the central processing hub via one or more dedicated telecommunication links.

Although one example embodiment of the mixed communications network includes a datacenter communications network and a colocation communications network, it should be understood that a mixed communications network may include any combination of the datacenter communications network, the colocation communications network, and the IP/VPN communications network without limitation.

In one embodiment, a communication routing (CR) computing device is in communication with and/or integral to the client device. The CR computing device is configured to monitor predefined conditions, such as traffic congestion, occupancy conditions, latency conditions, and/or network outages, for a plurality of the communications networks described above. Based upon the predefined conditions, the CR computing device is configured to select a communications network from the plurality of communications networks to transfer a data message between the client device and the central processing hub. The CR computing device may be further configured to give preference to a particular communications network based on entity (e.g., client) processing capabilities, business priorities, and/or entity needs. The communications network may be additionally or alternatively selected based upon other factors, such as geography.

The methods and systems described herein may be implemented using computer programming or engineering techniques including computer software, firmware, hardware or any combination or subset thereof, wherein the technical effect is achieved by performing at least one of: (a) connecting a client device to one or more interface processors, and (b) connecting the one or more interface processors to a central processing hub using one or more communications networks, where the central processing hub is configured to receive, via the interface processor, a data message transmitted by the client device over a communications network of the one or more communications networks.

The systems and methods described herein provide at least the technical advantage(s) of: (a) providing redundant communications networks to avoid network failures, (b) increase bandwidth availability by increasing communications network options, (c) decreasing network congestion, (d) decreasing transaction processing time, (e) providing increased flexibility in data processing options to accommodate a wider variety of clients, (f) reducing time to market for a wider variety of clients, (g) reducing hardware and infrastructure costs, and (h) centralizing interface processors to reduce operating complexing improve infrastructure availability for clients within a region.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of The Open Group). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to predicting the probability that a chargeback request will reach a presentment stage, a re-presentment stage, or an arbitration stage.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is an example system 100 for processing data messages, such as those associated with payment card (e.g., credit card or debit card) transactions, using a communications network 101. Communications network 101 may include one or more of a datacenter communications network, a colocation communications network, a mixed communications network, and/or an IP/VPN communications network. Communications network 101 is configured to communicatively connect one or more client device(s) 102 to a central processing hub 103 (e.g., BANKNET®). One or more client devices 102 may be located at an acquiring bank 104, and one or more client devices 102 may be located at an issuing bank 106. As described further herein, in the datacenter communications network and in some implementations of the mixed communications network, one or more interface processors 108 are physically located at a client datacenter (i.e., acquiring bank 104 and/or issuing bank 106). Each interface processor 108 may be integral to a client device 102, may be in direct communication with the client device 102, and/or may be otherwise communicatively coupled to the client device 102 via a host-link (e.g., an internet-based host-link). In the colocation communications network and in some implementations of the mixed communications network, one or more interface processors 108 (e.g., rack-mounted interface processors 108) are physically located at a colocation facility 110. In the IP/VPN communications network and in some implementations of the mixed communications network, one or more interface processors 108 (e.g., rack-mounted interface processors 108) are physically located at central processing hub 103.

In one example embodiment, system 100 is used for processing payment card transactions. Client device 102 of acquiring bank 104 receives payment card data and purchase data (collectively "transaction data") from a merchant computing device (not shown) and transmits an authorization request message through communications network 101 to central processing hub 103. The authorization request message seeks authorization to complete a given transaction from issuing bank 106 that issued the payment card. The authorization request message is routed through an interface processor 108 (i.e., MASTERCARD INTERFACE PROCESSOR™ or "MIP," where the payment card is Master-Card branded—although the process may be analogous or equivalent for other payment card as well), which interfaces with communications network 101 and is operable to facilitate data communication between client device 102 and central processing hub 103.

The authorization request message traverses communications network 101 to central processing hub 103, which, in one embodiment, transmits the authorization message to issuing bank 106 (e.g., via another interface processor 108). Assuming that the transaction is authorized by or on behalf of issuing bank 106, an authorization response message is sent back through central processing hub 103 and communications network 101 to the client device 102.

In one example embodiment, the merchant computing device (not shown) also monitors and stores transaction data associated with the payment transaction. Such information may include, for example and without limitation, the date and time of the transaction, an identifier associated with the merchant, an identifier associated with the merchant, a description of the product involved in the transaction, a categorization of the transaction (e.g., a purchase or a return), a transaction result (e.g., authorization or denial), a value associated with the transaction, and a location of the transaction including the location of the merchant. Such transaction data is exchanged during the processing of the payment card transaction using communications network 101. In the example embodiment, the transaction data is transmitted in an ISO® 8583 compliant data message. As used herein, "ISO®" refers to a series of standards approved by the International Organization for Standardization. (ISO is a registered trademark of the International Organization for Standardization of Geneva, Switzerland.) ISO® 8583 compliant messages are defined by the ISO® 8583 standard which governs financial transaction card originated messages and further defines acceptable message types, data elements, and code values associated with such financial transaction card originated messages. ISO® 8583 compliant messages include a plurality of specified locations for storing Private Data Elements. In some embodiments, the communication between acquiring bank 104 and/or central processing hub 103 and/or issuing bank 106 (e.g., communication of data messages over communications network 101) conforms to the ISO® 8583 international standards.

Figure 2:
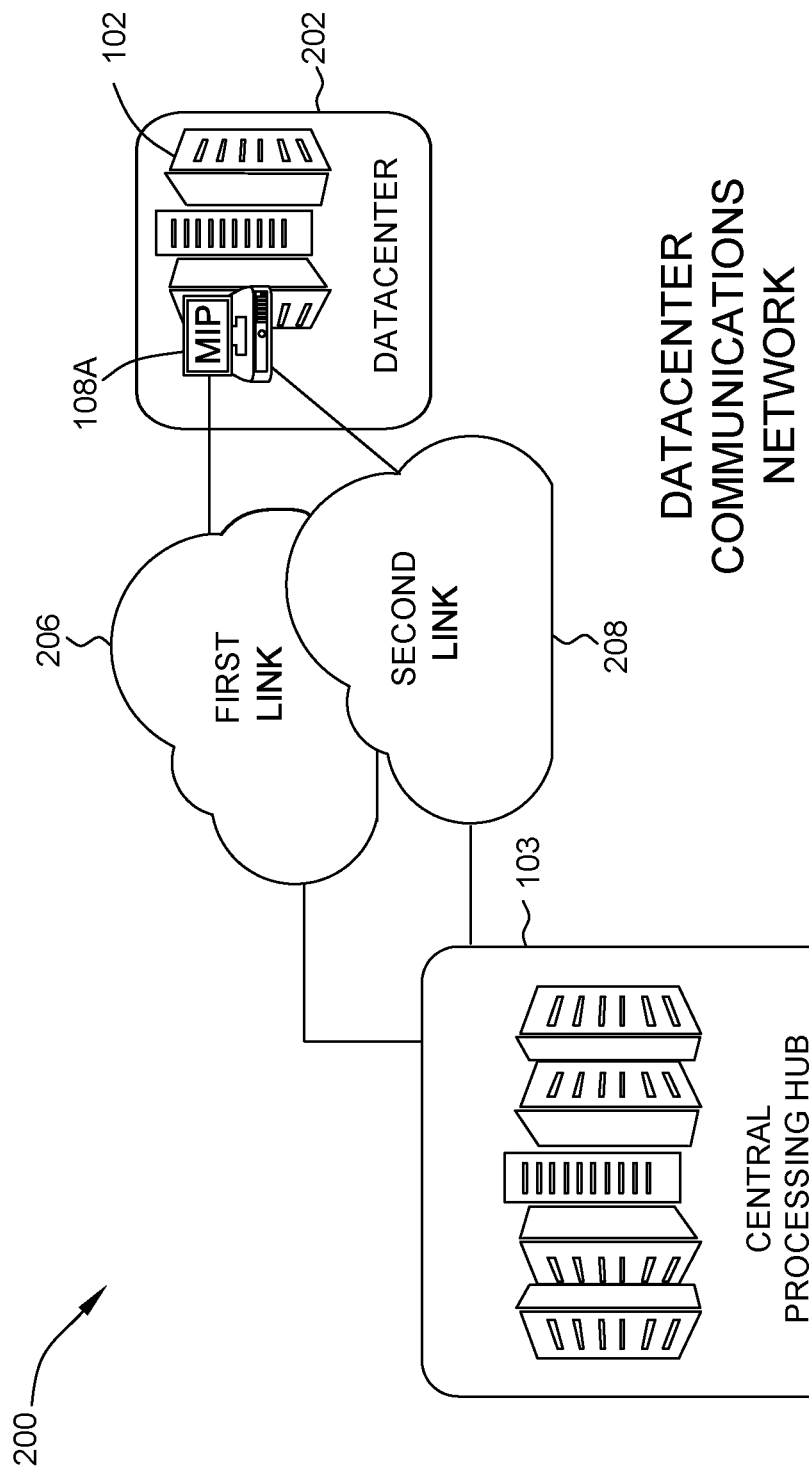
FIG. 2 is a block diagram of a datacenter communications network for routing data messages between a client device and a central processing hub.

FIG. 2 is a block diagram of a datacenter communications network 200 for routing data messages between client device 102 and central processing hub 103. An interface processor 108A is physically located at a client facility or datacenter 202. In some embodiments, interface processor 108A may include one or more discrete interface processors 108A. For example, some client datacenters 202 include a "dual interface processor" 108A that includes two individual interface processors 108A, for redundancy. Client datacenter 202 also houses client device 102. Interface processor 108A is integral to and/or otherwise communicatively coupled to (e.g., via an internet-based host-link) client device 102. Interface processor 108A is in communication with central processing hub 103 via a dedicated telecommunication link 206 (a "first telecommunications link"). Interface processor 108A is configured to enable communication of data messages between client device 102 and central processing hub 103 by interfacing with dedicated telecommunication link 206.

In some embodiments, datacenter communications network 200 may include one or more second telecommunications links 208. In some cases, second telecommunications link 208 functions as a "secondary" telecommunications link and provides redundancy in case of failure of one or more components of datacenter communications network 200, particularly first telecommunications link 206. In other words, second telecommunications link 208 is only accessed when first or "primary" telecommunications link 206 is not being accessed. Moreover, each telecommunications link 206, 208 is managed and maintained by the telecommunications provider with which the link 206, 208 is associated. First and second telecommunications links 206, 208 may be managed and maintained by the same telecommunications provider or by different telecommunications providers. The client (e.g., an entity associated with client datacenter 202) may be responsible for maintaining the host-link connecting client device 102 and interface processor 108A (e.g., an internet-based link and/or direct wired connections). In other cases, an entity associated with central processing hub 103 (e.g., BANKNET®) may be responsible for managing and maintaining first telecommunication link 206 and/or second telecommunication link 208. In these cases, first and second telecommunications links 206, 208 may function "in parallel" and be used for processing data messages at the same time, substantially continuously. Such embodiments may be preferable for clients with high processing requirements. Datacenter communications network 200 may represent "traditional" data message processing, such as transaction processing.

Figure 3:
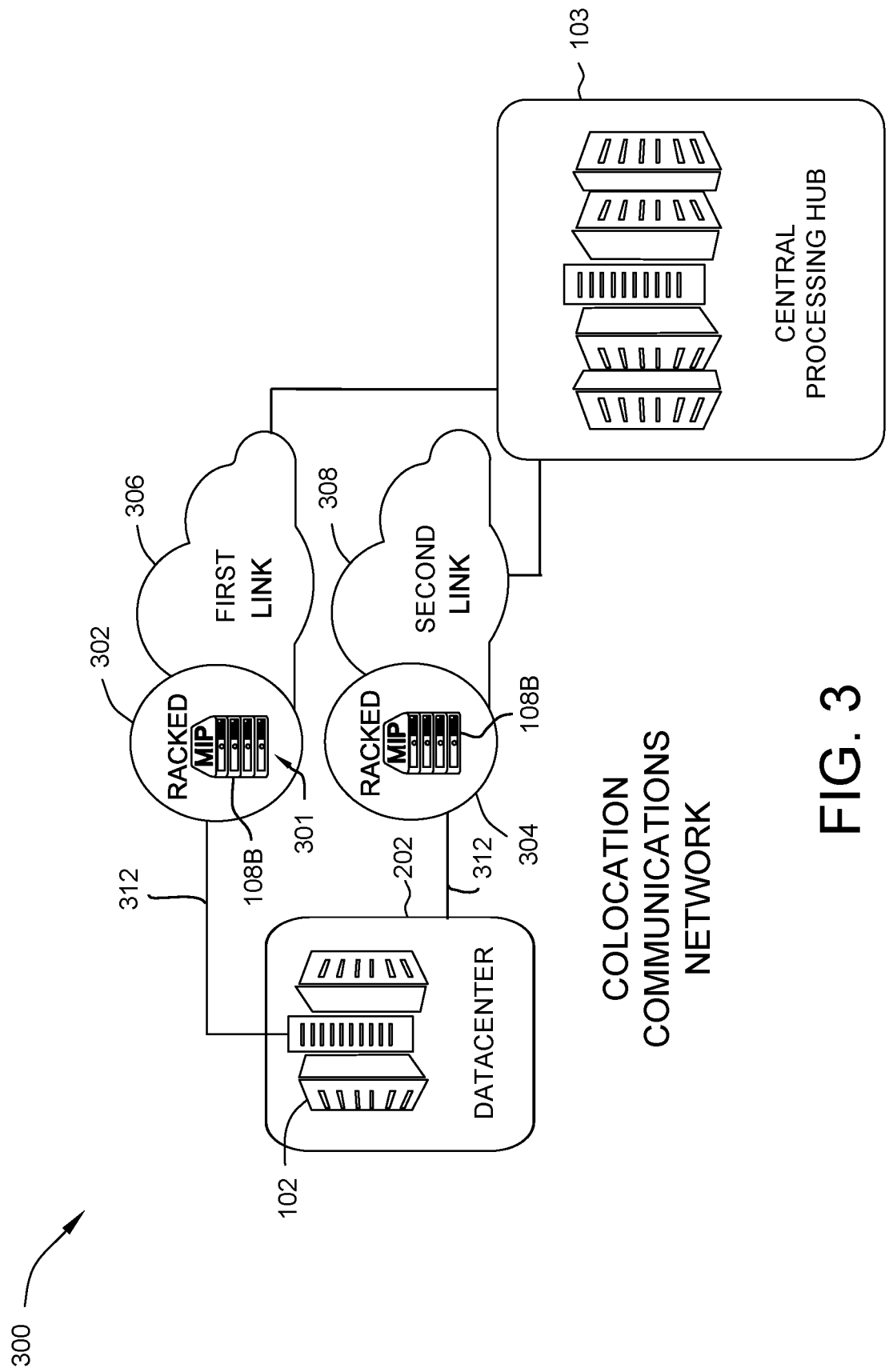
FIG. 3 is a block diagram of a colocation communications network for routing data messages between a central processing hub and a client device.

FIG. 3 is a block diagram of a colocation communications network 300 for routing data messages between client device 102 and central processing hub 103. Although client datacenters 202 still house client device 102, colocation communications network 300 includes a plurality of rack-mounted interface processors 108B that are physically located in colocation facilities 302. Each "rack" 301 of rack-mounted interface processors 108B may include, for example, 20 separate and discrete interface processors 108B. Each rack-mounted interface processor 108B may be associated with a different client (e.g., acquiring or issuing bank), and each rack-mounted interface processor 108B can be controlled (e.g., updated or configured) individually. Rack-mounted interface processors 108B are in communication with central processing hub 103 via a dedicated telecommunication link 306 (a "first telecommunication link"). Interface processors 108B are configured to enable communication of data messages between client device 102 and central processing hub 103 by interfacing with dedicated telecommunication link 306.

In some embodiments, the client (e.g., an entity associated with client datacenter 202) is responsible for maintaining a host-link 312 connecting client device 102 and to the one or more rack-mounted interface processors 108B at colocation facility 302. Host-link 312 may include, for example, an internet-based communication link and/or an MPLS link. Because host-link 312 is the client's responsibility, colocation communications network 300 offers the client increased flexibility in choosing their host-link. Moreover, the entity associated with central processing hub 103 (e.g., BANKNET®) does not have to provide the client with hardware or infrastructure to connect to the interface processor 108B. Not only does this save this entity (e.g., BANKNET®) money, but this also greatly reduces "time to market," or the time it takes for the client to get connected to central processing hub 103.

For example, in implementing datacenter communications network 200, there are two important timelines that make up the delivery of customer connectivity to a payment network, or "time to market", namely (i) network equipment delivery, and (ii) telecommunication link provisioning. These timelines run in parallel and, depending on the location of the customer, the telecommunications link (e.g., MPLS network) provisioning timeline may be significantly longer than that of the network equipment delivery timeline. In other words, the client has to wait for a dedicated telecommunications link to be provided and for a dedicated interface processor 108A and associated hardware (e.g., dedicated routers) to be delivered and installed. The time to market for datacenter communications network 200 may be, in some cases, four to six months. Colocation communications network 300 is the equivalent of an "interface processor in the cloud." The client merely needs to provide their own host-link 312 to the rack-mounted interface processor 108B, which is already set up with a dedicated telecommunications link 306 to central processing hub 103. The entity associated with central processing hub 103 (e.g., BANKNET®) is responsible for managing and maintaining first telecommunications link 306 between interface processors 108B and central processing hub 103. Accordingly, the time to market may be reduced to a matter of days or weeks (e.g., 30 days as opposed to four months). Moreover, colocation communications network 300 may increase availability of access to central processing hub 103 to clients that may have been unable to connect to central processing hub 103 using a traditional (e.g., MPLS) network connection.

In some embodiments, colocation communications network 300 includes a second telecommunication link 308 configured to enable communication between client device 102 and central processing hub 103 through a second plurality of rack-mounted interface processors 108B. These rack-mounted interface processors 108B are physically located at a second colocation facility 304, which is physically and geographically separate from colocation facility 302. In some cases, second telecommunication link 308 and the second plurality of rack-mounted interface processors 108B function as "secondary" links and may provide redundancy to colocation communications network 300 (e.g., in case of failure of one or more components of colocation communications network 300, particularly first telecommunications link 306). In other words, second telecommunications link 308 is only accessed when first or "primary" telecommunications link 306 is not being accessed. In other cases, first and second telecommunications links 306, 308 may function "in parallel" and be used for processing data messages at the same time, substantially continuously. In some embodiments, colocation communications network 300 may only be available to domestic client devices 102 (e.g., client devices 102 located in the same country or region as central processing hub 103 and/or colocation facilities 302, 304) and/or as an access point for international "backbone" client devices 102. Colocation communications network 300 may provide a cost-effective and flexible option for disaster recovery efforts for client datacenters 202 unable to physically contain/receive an interface processor 108.

Figure 4:
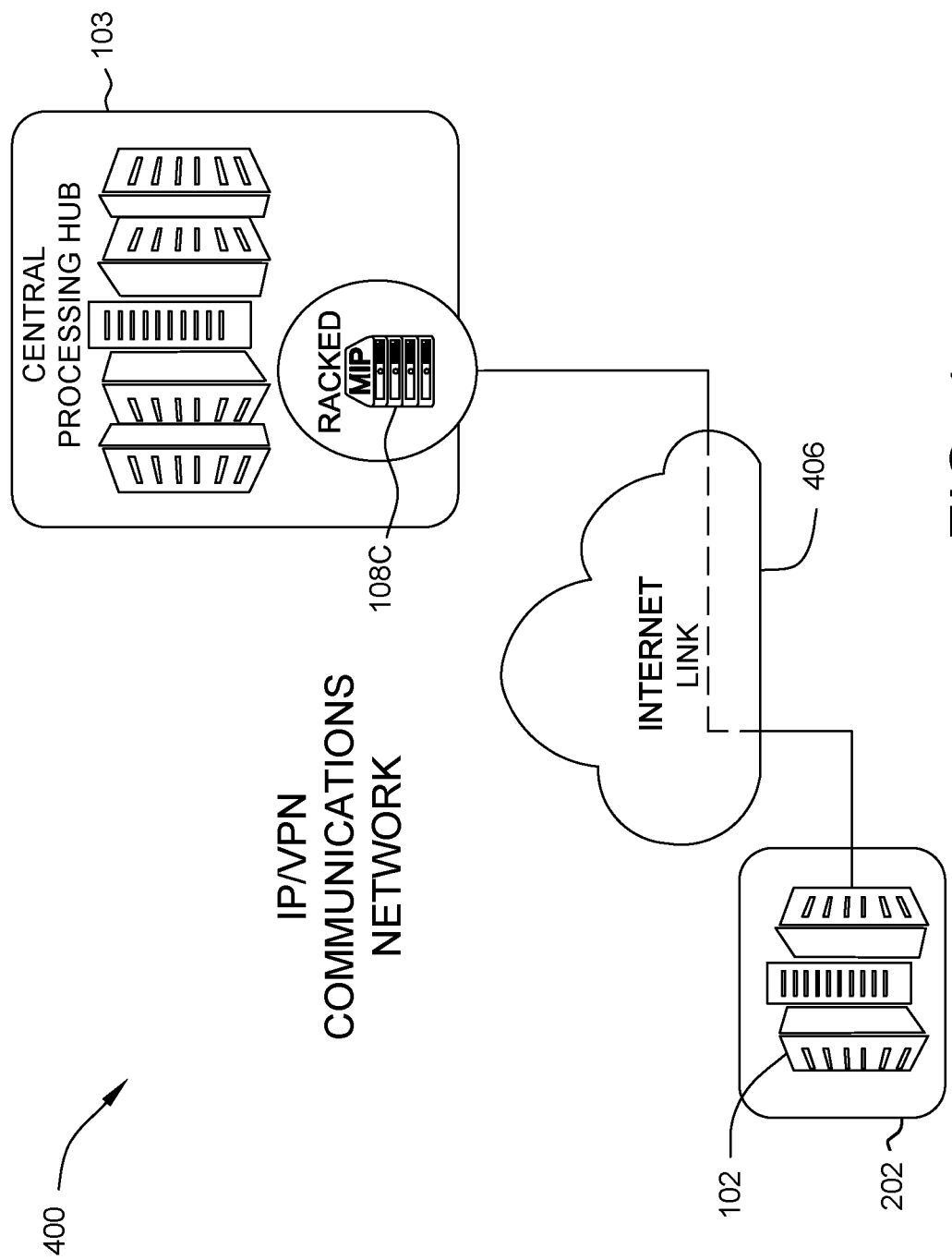
FIG. 4 is a block diagram of an IP/VPN communications network for routing data messages between a client device and a central processing hub.

FIG. 4 is a block diagram of an IP/VPN communications network 400 for routing data messages between client device 102 and central processing hub 103. IP/VPN communications network 400 includes a plurality of rack-mounted interface processors 108C that are physically located at central processing hub 103. Client datacenter 202 still houses client device 102. Client device 102 is connected to rack-mounted interface processors 108C via an Internet protocol (IP) network or a virtual private network (VPN) 406, referred to as an "Internet link" 406. Moreover, rack-mounted interface processors 108C are in communication with central processing hub 103 via Internet link 406. Interface processors 108C are configured to enable communication of data messages between client device 102 and central processing hub 103 by interfacing with Internet link 406. In the example embodiment, the client (e.g., an entity associated with client datacenter 202) is responsible for providing Internet link 406 that connects client device 102 and interface processors 108C, and the central processing hub 103 (and/or an entity associated therewith) is responsible for maintaining a "server-side" host-link that connects interface processors 108C and central processing hub 103. In some embodiments, one or both of client device 102 and central processing hub 103 may be required to provide and/or install a firewall to ensure data security of the data message transmitted therebetween. IP/VPN communications network 400 may provide the fastest implementation or time to market (e.g., out of the various communications networks described herein). As described above with reference to colocation communications network 300, the client need only provide an internet-based connection, saving time and money. However, IP/VPN communications network 400 may be better suited for clients with lower processing requirements and/or less need for constant connectivity to central processing hub 103, as Internet-based connections, in some cases, may be less reliable or stable than, for example, an MPLS network connection.

Figure 5:
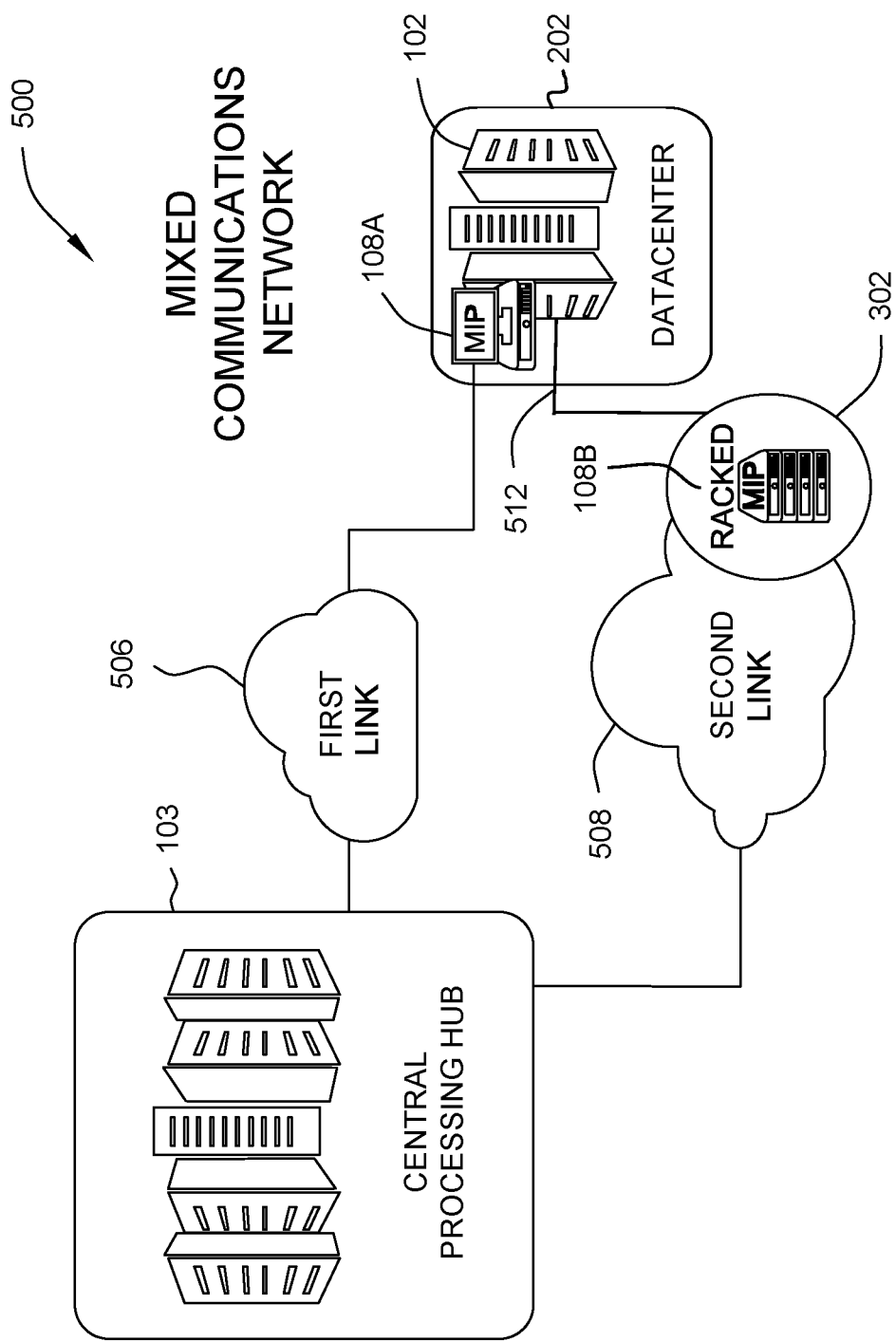
FIG. 5 is a block diagram of a mixed communications network for routing data messages between a client device and a central processing hub.

FIG. 5 is a block diagram of one implementation of a mixed communications network 500 for routing data messages between client device 102 and central processing hub 103. In the illustrated embodiment, an interface processor 108A (also shown in FIG. 2) is physically located at client facility or datacenter 202. Client datacenter 202 also houses client device 102. Interface processor 108A is integral to and/or otherwise communicatively coupled to (e.g., via an internet-based host-link) client device 102. Interface processor 108A is in communication with central processing hub 103 via a dedicated telecommunication link 506 (a "first telecommunications link"). Interface processor 108A is configured to enable communication of data messages between client device 102 and central processing hub 103 by interfacing with first telecommunication link 506. In some embodiments, the client (e.g., an entity associated with client datacenter 202) is responsible for maintaining a host-link connecting client device 102 and interface processor 108A. In some embodiments, an entity associated with central processing hub 103 (e.g., BANKNET®) is responsible for managing first telecommunication link 506, which may be maintained by a telecommunications provider or by the entity associated with central processing hub 103.

Mixed communications network 500 further includes one or more second communications links 508 between client device 102 and rack-mounted interface processors 108B located in a colocation facility 302 (both also shown in FIG. 3). Rack-mounted interface processors 108B are also in communication with central processing hub 103 through secondary communication link(s) 508. In one embodiment, as described above with respect to colocation communications network 300, the client may be responsible for maintaining a host-link 512 (e.g., an internet-based connection or MPLS network connection) between client device 102 and rack-mounted interface processors 108B. The entity associated with central processing hub 103 (e.g., BANKNET®) may be responsible for maintaining second communications link 508. Second communication link(s) 508 may include dedicated telecommunications links and/or Internet-based communications links. Mixed communications networks 500, as illustrated in FIG. 5 and/or in other implementations, may provide flexibility for clients to integrate into system 100 (shown in FIG. 1). For example, a client may greatly reduce time to market by accessing second communications link 508 for a period of time until first telecommunications link 506 may be set up (e.g., have hardware and infrastructure sent, configured, and installed). Mixed communications network 500 may further provide redundancy and/or flexibility for data processing when one of the first and second communication link(s) 506, 508 are unavailable or are processing at less than ideal speeds, for example. In these cases, second communication link 508 may function as a secondary communication links and may only be accessed when first or "primary" telecommunications link 506 is not being accessed. In other cases, first and second telecommunications links 506, 508 may function "in parallel" and be used for processing data messages at the same time, substantially continuously.

Figure 6:
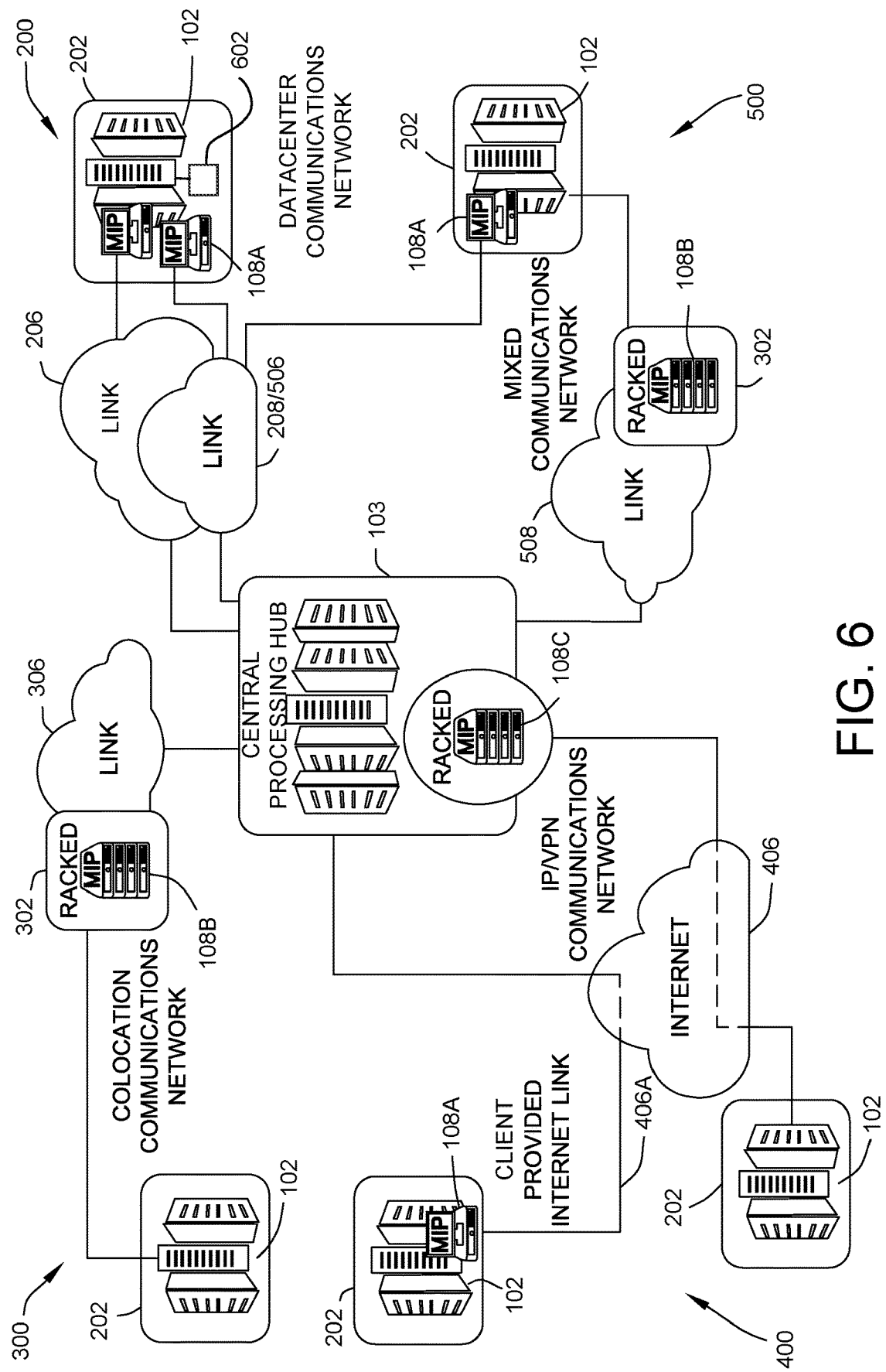
FIG. 6 is a block diagram of a hybrid communication network including the datacenter communications network shown in FIG. 2, the colocation communications network shown in FIG. 3, the IP/VPN communications network shown in FIG. 4, and the mixed communications network shown in FIG. 5, and for routing data messages between a client device and a central processing hub.

FIG. 6 is a block diagram of a hybrid communications system 600 including one or more of the communications networks described herein for routing data messages between client device 102 and central processing hub 103. More specifically, hybrid communications system includes datacenter communications network 200 (shown in FIG. 2), colocation communications network 300 (shown in FIG. 3), IP/VPN communications network 400 (shown in FIG. 4), and mixed communications network 500 (shown in FIG. 5). Hybrid communications system 600 may include and/or be similar to system 100 shown in FIG. 1. Client devices 102 are located at client datacenters 202 (e.g., acquiring bank 104 and/or issuing bank 106, both shown in FIG. 1). Client devices 102 may be configured to use one or more of communications networks 200, 300, 400, and/or 500 to transmit data messages to and receive data messages from (e.g., data messages including transaction data) central processing hub 103.

As described herein, in datacenter communications network 200 and in some implementations of mixed communications network 500, interface processors 108A are located within client datacenters 202 and may be integral to and/or communicatively coupled to (e.g., via a host-link) a client device 102. In colocation communications network 300 and in some implementations of mixed communications network 500, rack-mounted interface processors 108B are located within a colocation facility 302. In IP/VPN communications network 400, rack-mounted interface processors 108C are located within central processing hub 103.

Moreover, in datacenter communications network 200 and mixed communications network 500, interface processors 108A are in communication with central processing hub 103 through dedicated telecommunication links 206, 208, and/or 506. In mixed communications network 500 and colocation communications network 300, rack-mounted interface processors 108B are in communication with central processing hub 103 through dedicated telecommunication links 306 and/or 508. In IP/VPN communications network 400, client device 102 uses Internet link 406 to communicate with rack-mounted interface processors 108C, located at central processing hub 103. In another embodiment of IP/VPN communications network 400, an interface processor 108A is physically located at client datacenter 202 and is communicatively coupled to client device through a host-link. In this embodiment, interface processor 108A is communicatively coupled to central processing hub 103 via a client-provided internet link 406A, as opposed to a dedicated telecommunications link (e.g., links 206, 208, 506).

In addition, hybrid communication network 600 may include one or more communication routing (CR) computing devices 602. CR computing device 602 is configured to select one of communications networks 200, 300, 400, and/or 500 to transmit a data message from a client device 102 to central processing hub 103. In some embodiments, CR computing device 602 is in communication with and/or included within a client device 102. In some embodiments, selecting a communication network 200, 300, 400, and/or 500 includes monitoring one or more of communications networks 200, 300, 400, and/or 500 (and/or the communication links included therein) that connect the client device 102 to central processing hub 103 to determine predefined conditions, such as network traffic congestion, bandwidth occupancy conditions, latency conditions, and/or network outages. CR computing device 602 is further configured to select the "optimal" network (e.g., fastest processing speed, most reliable, most secure, etc.) for transmitting the data message based upon one or more of the predefined conditions. CR computing device 602 is further configured to configure and/or enable the client device 102 to transmit the data message using the selected network 200, 300, 400, and/or 500. More particularly, CR computing device 602 may be further configured to select one of a first and second communication link (e.g., one of first and second telecommunications links 206, 208; or one of first and second communication links 506, 508) within a particular one of networks 200, 300, 400, and/or 500. For example, CR computing device 602 may monitor one or more characteristics of each communication link within a network 200, 300, 400, and/or 500, such as network traffic congestion, bandwidth occupancy conditions, latency conditions, and/or network outages, and select the particular communication link with the optimal characteristics.

Figure 7:
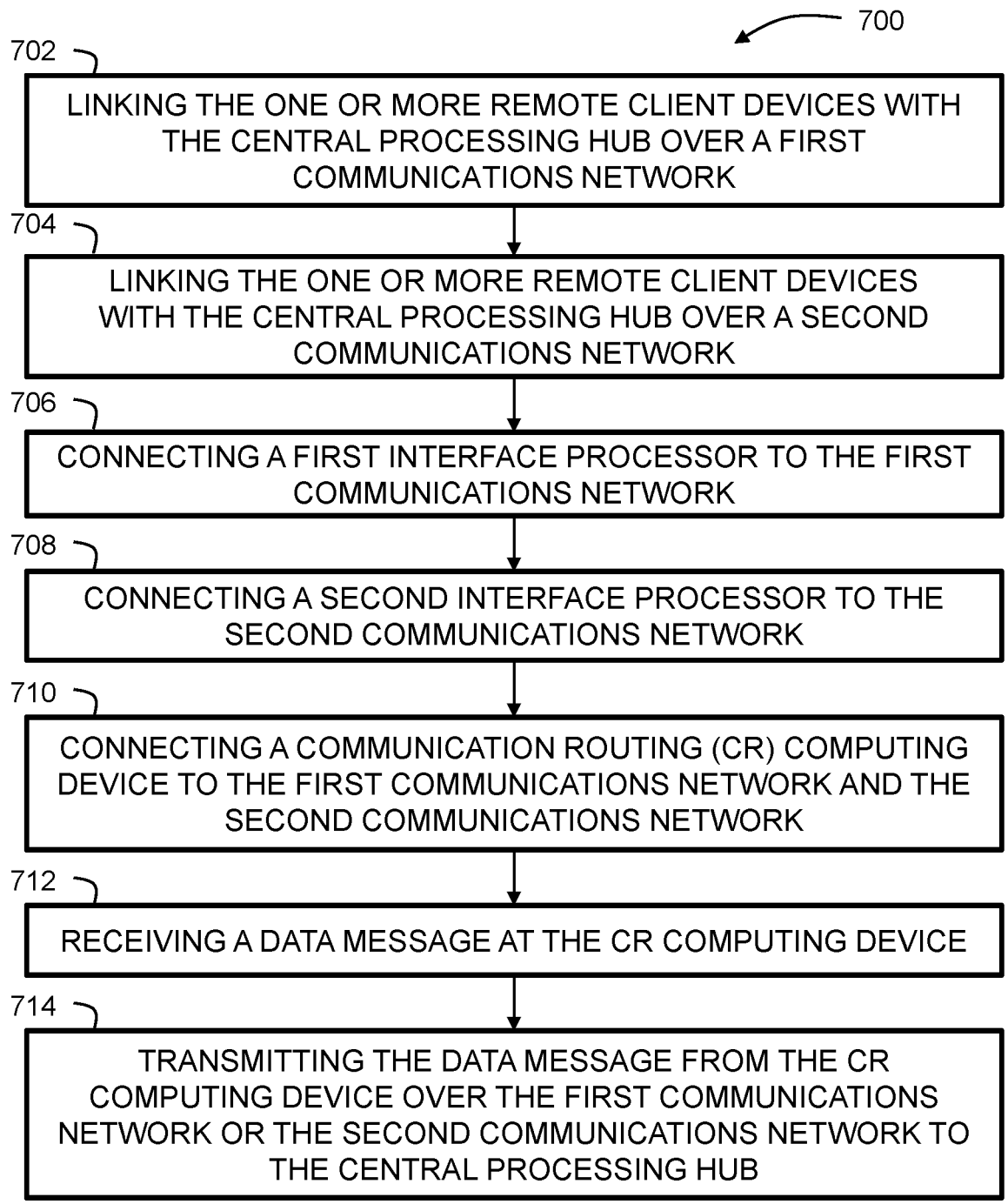
FIG. 7 is a data flow diagram illustrating a method for transmitting a data message from one or more remote client devices to a central processing hub, implemented using the system shown in FIG. 1.

FIG. 7 is a data flow diagram illustrating a method 700 for transmitting a data message from one or more remote client devices (e.g., client devices 102, shown in FIG. 1) to a central processing hub (e.g., central processing hub 103, also shown in FIG. 1). Method 700 may be implemented using one or more components of system 100.

Method 700 includes linking 702 one or more remote client devices with the central processing hub over a first communications network of a plurality of communications networks. Method 700 also includes linking 704 the one or more remote client devices with the central processing hub over a second communications network of the plurality of communications networks.

Method 700 further includes connecting 706 a first interface processor to the first communications network, connecting 708 a second interface processor to the second communications network, and connecting 710 a communication routing (CR) computing device to the first communications network and the second communications network. Method 700 also includes receiving 712 a data message at the CR computing device, and transmitting 714 a data message from the CR computing device over the first communications network or the second communications network to the central processing hub.

Figure 8:
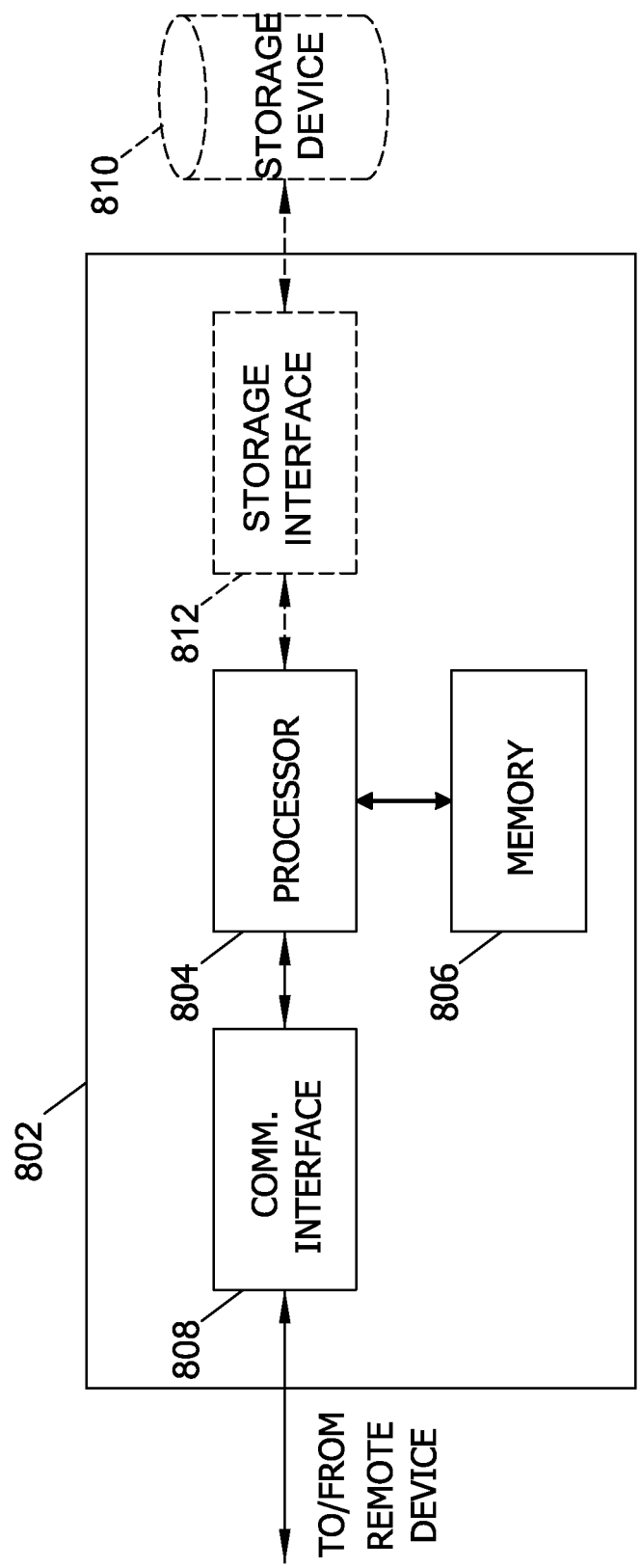
FIG. 8 illustrates an example configuration of a communication routing (CR) computing device for selecting a communications network to transmit a data message from one of the communications networks described in FIGS. 2-6.

FIG. 8 illustrates an example configuration of a communication routing (CR) computing device 802 for selecting a communications network for transmitting a data message. CR computing device 802 may include and/or be similar to CR computing device 602 (shown in FIG. 6).

CR computing device 802 includes a processor 804 for executing instructions. Instructions may be stored in a memory area 806, for example. Processor 804 may include one or more processing units (e.g., in a multi-core configuration).

Processor 804 is operatively coupled to a communication interface 808 such that CR computing device 802 is capable of communicating with a remote client device such as a client device 102 or another computing device. For example, communication interface 808 may configure client device to select a network from one or more networks for a data transmission.

Processor 804 may also be operatively coupled to a storage device 810. Storage device 810 is any computer-operated hardware suitable for storing and/or retrieving data. In some embodiments, storage device 810 is integrated in CR computing device 802. For example, CR computing device 802 may include one or more hard disk drives as storage device 810. In other embodiments, storage device 810 is external to CR computing device 802 and may be accessed by a plurality of server computer devices. For example, storage device 810 may include multiple storage units such as hard disks or solid state disks in a redundant array of inexpensive disks (RAID) configuration. Storage device 810 may include a storage area network (SAN) and/or a network attached storage (NAS) system.

In some embodiments, processor 804 is operatively coupled to storage device 810 via a storage interface 812. Storage interface 812 is any component capable of providing processor 804 with access to storage device 810. Storage interface 812 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 804 with access to storage device 810.

Memory area 806 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

CR computing device 802 relies on an Internet Protocol suite to select the optimal network to transmit the data. The suite is made up of 4 distinct layers (Application, Transport, Internet, and Link). The Transport layer is responsible for end-to-end message transmission. A commonly used protocol of this layer is the Border Gateway Protocol (BGP). CR computing device 802 communicate with other CR computing devices 802 in the same network using the BGP. The BGP determines the most optimal route based on available paths, routing policies, and other specific rules manually entered/configured in CR computing device 802 by network engineers.

As will be appreciated based on the foregoing specification, the above-described examples of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed examples of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communications network or link. The article of manufacture containing the computer code may be made and/or used by executing the code directly from one medium, by copying the code from one medium to another medium, or by transmitting the code over a network.

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

For example, one or more computer-readable storage media may include computer-executable instructions embodied thereon for determining the probability of an authorized transaction resulting in a chargeback. In this example, the computing device may include a memory device and a processor in communication with the memory device, and when executed by said processor the computer-executable instructions may cause the processor to perform a method such as the method described and illustrated in the example of FIG. 5.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A networking system for transmitting a data message from one or more remote client devices to a central processing hub, said system comprising:
    a plurality of communications networks each connecting the central processing hub with the one or more remote client devices, the plurality of communications networks including at least two independent communications networks having different network structures;
    a respective interface processor that interfaces with each of the plurality of communications networks to connect the one or more remote client devices to the central processing hub; and
    a respective communication routing (CR) computing device associated with each of the one or more remote client devices, each CR computing device connected to each of the plurality of communications networks;
    wherein a first CR computing device associated with a first remote client device of the one or more remote client devices is connected to each of the plurality of communications networks and is configured to:
        receive a data message from the first remote client device,
        select one communications network from the plurality of communications networks to which to direct the data message for transmission to the central processing hub, and
        direct the data message to the selected communications network, and
    wherein the data message is a payment transaction data message.

2. The networking system of claim 1, wherein the CR computing device is further configured to select one communications network from the plurality of communications network to which to direct the data message, based on a set of conditions including one or more of network traffic congestion, occupancy conditions, latency conditions, or network outages.

3. The networking system of claim 1, wherein the plurality of communications networks includes at least one datacenter communications network, wherein the at least one datacenter communications network comprises (i) the one or more remote client devices; (ii) the respective interface processor located proximate to the one or more remote client devices in a client datacenter; and (iii) a communication link linking the one or more remote client devices to the respective interface processor and the central processing hub.

4. The networking system of claim 1, wherein the plurality of communications networks includes at least one colocation communications network, wherein the at least one colocation communications network comprises (i) the one or more remote client devices;
    (ii) the respective interface processor located remote from the one or more remote client devices at a colocation facility remote from a client datacenter; and (iii) a communication link linking the one or more remote client devices to the respective interface processor and the central processing hub.

5. The networking system of claim 1, wherein the plurality of communications networks includes at least one IP/VPN communications network, wherein the at least one IP/VPN communications network comprises (i) the one or more remote client devices; (ii) the respective interface processor located proximate to the central processing hub; and (iii) an internet-based communication link linking the one or more remote client devices to the respective interface processor.

6. The networking system of claim 1, wherein the at least two independent networks include at least a datacenter communications network and a colocation communications network.

7. The networking system of claim 1, wherein the at least two independent networks include at least a datacenter communications network and an IP/VPN communications network.

8. The networking system of claim 1, wherein the at least two independent networks include at least a colocation communications network and an IP/VPN communications network.

9. A computer-implemented method for transmitting a data message from one or more remote client devices to a central processing hub, the method implemented using the one or more remote client devices, the central processing hub, at least two interface processors, a communication routing (CR) computing device, and a plurality of communications networks, the method comprising:
    linking the one or more remote client devices with the central processing hub over a first communications network of the plurality of communications networks;
    linking the same one or more remote client devices with the central processing hub over a second communications network of the plurality of communications networks, wherein the first and second communications networks are independent communications networks having different network structures;
    connecting a first interface processor to the first communications network;
    connecting a second interface processor to the second communications network;
    connecting the CR computing device between a first remote client device of the same one or more remote client devices and each of the first communications network and the second communications network;
    receiving a data message at the CR computing device; and
    transmitting the data message from the CR computing device over the first communications network or the second communications network to the central processing hub.

10. The method in accordance with claim 9, wherein linking the one or more remote client devices with the central processing hub over a first communications network comprises linking the one or more remote client devices with the central processing hub over a datacenter communications network, and wherein the method further comprises (i) locating the first interface processor proximate to the one or more remote client devices at a client datacenter; and (ii) linking, via a communication link, the one or more remote client devices to the first interface processor and the central processing hub.

11. The method in accordance with claim 9, wherein linking the one or more remote client devices with the central processing hub over a first communications network comprises linking the one or more remote client devices with the central processing hub over a colocation communications network, and wherein the method further comprises (i) locating the first interface processor remote from the one or more remote client devices at a colocation facility remote from a client datacenter; and (ii) linking, via a communication link, the one or more remote client devices to the first interface processor and the central processing hub.

12. The method in accordance with claim 9, wherein linking the one or more remote client devices with the central processing hub over a first communications network comprises linking the one or more remote client devices with the central processing hub over at least one IP/VPN communications network, and wherein the method further comprises (i) locating the first interface processor proximate to the central processing hub; and (ii) linking, via an internet-based communication link, the one or more remote client devices to the first interface processor.

13. The method in accordance with claim 9, wherein linking the one or more remote client devices with the central processing hub over a first communications network comprises linking the one or more remote client devices to one of a datacenter communications network, a colocation communications network, and an IP/VPN communications network, and wherein linking the same one or more remote client devices with the central processing hub over a second communications network comprises linking the one or more remote client devices to another of the datacenter communications network, the colocation communications network, and the IP/VPN communications network.

14. The method in accordance with claim 9, further comprising selecting, by the CR computing device, one of the first communications network or the second communications network for transmitting the data message based on a set of conditions that include one or more of network traffic congestion, occupancy conditions, latency conditions, or network outages.

15. A communication routing (CR) computing device for enabling a remote client device to transmit data messages using a selected communications network, the CR computing device in communication with the remote client device and at least two communications networks, wherein the at least two communications networks are independent communications networks having different network structures, and wherein the remote client device in communication with the at least two communications networks, the CR computing device comprising:
    a processor; and
    a memory coupled to said processor, said processor configured to:
        monitor characteristics of the at least two communications networks;
        select a first communications network having a first network structure from the at least two communications networks based on a first set of conditions determined from the characteristics;
        enable the remote client device to transmit a first data message using the selected first communications network;
        select a second communications network having a second, different network structure from the at least two communications networks based on a second set of conditions determined from the characteristics; and
        enable the remote client device to transmit a second data message using the selected second communications network.

16. The CR computing device of claim 15, wherein the set of conditions include one or more of network traffic congestion, occupancy conditions, latency conditions, or network outages.

17. The CR computing device of claim 15, wherein the at least two communications networks include at least two of a datacenter communications network, a colocation communications network, and an IP/VPN communications network.

18. A hybrid networking system for transmitting a data message from one or more remote client devices to a central processing hub, said system comprising:
    the one or more remote client devices located at one or more respective client datacenters;
    the central processing hub;
    a first communications network comprising:
        a first interface processor located proximate to the one or more remote client devices in a client datacenter; and
        a first communication link linking the one or more remote client devices to the first interface processor and the central processing hub; and
    a second communications network comprising:
        a second interface processor located remote from the same one or more remote client devices; and
        a second communication link linking the same one or more remote client devices to the first interface processor and the central processing hub.

19. A hybrid networking system in accordance with claim 18, wherein the second interface processor comprises one interface processor of a plurality of rack-mounted processors located at a colocation facility remote from the one or more client datacenters, and wherein the second communication link comprises at least one of an internet-based link and a telecommunications link.

20. A hybrid networking system in accordance with claim 18, wherein the second interface processor comprises one interface processor of a plurality of rack-mounted processors located at proximate to the central processing hub, and wherein the second communication link comprises at least one of an internet-based link and a telecommunications link.

* * * * *